United States Patent [19]

Ito et al.

[11] 4,456,107
[45] Jun. 26, 1984

[54] SPEED CHANGE CONTROL APPARATUS AND METHOD FOR AUTOMATIC TRANSMISSION

[75] Inventors: Hiroshi Ito; Sinsuke Kusumoto, both of Toyota, Japan

[73] Assignee: Toyota Jidosha Kogyo Kabushiki Kaisha, Toyota, Japan

[21] Appl. No.: 312,929

[22] Filed: Oct. 19, 1981

[30] Foreign Application Priority Data

Oct. 31, 1980 [JP] Japan ................ 55-152182

[51] Int. Cl.³ .................................. B60K 41/28
[52] U.S. Cl. ............................. 192/3.31; 74/866; 192/0.052; 192/0.076
[58] Field of Search ............ 192/3.3, 3.31, 3.57, 192/3.58, 0.033, 0.052, 103 R, 0.076; 74/866, 731

[56] References Cited

U.S. PATENT DOCUMENTS

4,226,295 10/1980 Rembold et al. .................. 74/866
4,270,636 6/1981 Sunohara et al. ................ 192/3.31

Primary Examiner—George H. Krizmanich
Assistant Examiner—M. Manley
Attorney, Agent, or Firm—Finnegan, Henderson, Farabow, Garrett & Dunner

[57] ABSTRACT

A direct coupled clutch is provided in parallel to a fluid type torque converter of an automatic transmission, and the supply of oil pressure to a hydraulic servo for the direct coupled clutch is controlled by an electromagnetic valve. When an accelerator pedal is returned with speed higher than a predetermined value, the direct coupled clutch is maintained in the disengaged condition only for a predetermined time so that impact caused by abrupt change in torque of an engine can be avoided.

12 Claims, 11 Drawing Figures

SPEED CHANGE CONTROL APPARATUS AND METHOD FOR AUTOMATIC TRANSMISSION

BACKGROUND OF THE INVENTION

1. Field of the Invention

This invention relates to a speed change control method for an automatic transmission in which a direct coupled clutch is provided in parallel to a fluid type torque converter, and the supply of oil pressure to a hydraulic servo for the direct coupled clutch and other friction engaging elements is controlled by an electromagnetic valve.

2. Description of the Prior Art

In such an automatic transmission, when vehicle speed exceeds a predetermined value, the direct coupled clutch is held in the engaging condition to prevent power losses in the fluid type torque converter. However, when an accelerator pedal is abruptly returned while the direct coupled clutch is in the engaged condition, transmission torque of a drive system changes abruptly to produce vibration in the drive system and a rough ride through the sway of car body.

SUMMARY OF THE INVENTION

An object of this invention is to provide a speed change control method for an automatic transmission by which a rough ride accompanying the abrupt return of the accelerator pedal can be prevented.

According to this invention to achieve this object, the direct coupled clutch is maintained in the disengaged condition for a predetermined time after the return speed of the accelerator pedal exceeds a predetermined value.

Thus, the abrupt change in the transmission torque of the drive system accompanying the abrupt return of the accelerator pedal is absorbed by the fluid type torque converter so that uncomfortable vibration of the car body can be avoided.

When the return speed of the accelerator pedal exceeds the predetermined value, a first timer is operated and the direct coupled clutch can be maintained in the disengaged condition while the first timer is operated. Also, the return speed of the accelerator pedal can be detected by detecting signals of a potentiometer for detecting the pedalling amount of the accelerator pedal.

Further, the alteration of the engaging condition of the friction engaging elements in the transmission gear is also preferably carried out while the direct coupled clutch is maintained in the disengaged condition. While impact caused by the difference of torque between the engine side and the drive gear side in the friction engaging elements is produced during speed change, the difference of torque is reduced by the fluid type torque converter to restrain the impact. In the operation of speed change, second and third timers are operated and the operating time of the third timer is longer than that of the second timer. In the operation of the third timer, the direct coupled clutch is maintained in the disengaged condition and the alteration of the engaging condition of the friction engaging elements in the transmission gear is preferably carried out between the completion of the operation of the second timer and that of the third timer.

Also, in the operation of the first timer, the alteration of the engaging condition of the friction engaging elements in the transmission is preferably stopped. Thus, the impact caused by the abrupt return of the accelerator pedal is deviated from that caused by the alteration of the engaging condition of friction engaging elements in the transmission gear with respect to time to reduce the total impact.

BRIEF DESCRIPTION OF THE PREFERRED EMBODIMENTS

Now, embodiments of this invention will be described with respect to the drawings.

Figure 1:
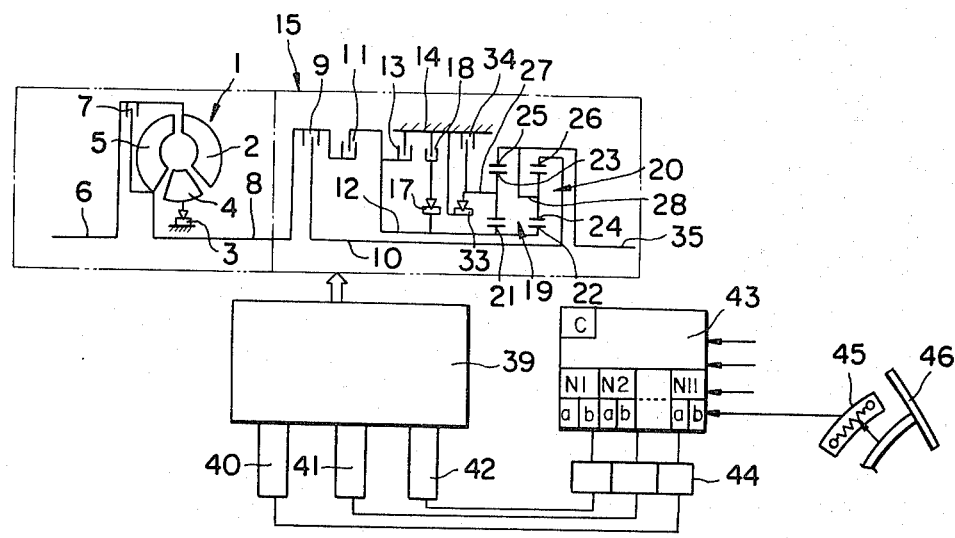
FIG. 1 is a schematic drawing showing the whole automatic transmission according to this invention.

FIG. 1 is a schematic drawing showing the whole automatic transmission according to this invention.

A fluid type torque converter 1 comprises a pump impeller 2, a stator 4 fixed to a housing through a one-way clutch 3 and a turbine runner 5, and the pump impeller 2 is coupled to a crankshaft 6 of an engine. A direct coupled clutch 7 is provided in parallel to the torque converter 1 to control the connection between the crankshaft 6 and the turbine runner 5. A turbine shaft 8 is coupled to the turbine runner 5 and connected to a center shaft 10 through a front clutch 9 of a transmission gear 15 while being connected to an intermediate shaft 12 through a rear clutch 11. The intermediate shaft 12 can be fixed to a housing 14 through a first brake 13 and also through an one-way clutch 17 and a second brake 18. Two planetary gears 19, 20 have respectively sun gears 21, 22, pinions 23, 24, ring gears 25, 26 and carriers 27, 28. The sun gears 21, 22 are provided integrally on the intermediate shaft 12, the carrier 27 can be fixed to the housing 14 through an one-way clutch 33 and also through a third brake 34, the ring gear 25 is coupled to the carrier 28, the ring gear 26 is coupled to the center shaft 10 and an output shaft 35 is coupled to the ring gear 25. The following table is a operation table for carrying out the respective speed change stages, figures corresponding to the respective engaging elements, representing the engaging condition and Δ showing the operation only in engine brake.

|           | 9 | 11 | 13 | 18 | 34 | 17 | 33 |
|-----------|---|----|----|----|----|----|----|
| 1st speed | O |    |    |    | Δ  |    | O  |
| 2nd speed | O |    | Δ  | O  |    | O  |    |
| 3rd speed | O | O  |    | O  |    |    |    |
| Reverse   |   | O  |    |    | O  |    |    |

The operation of the respective engaging elements except for the one-way clutches 17, 33 is controlled by the supply of oil pressure to a hydraulic servo provided corresponding to the engaging elements, and this supply of oil pressure is controlled by a 1-2 solenoid valve 40 and a 2-3 solenoid valve 41 provided in a hydraulic control 39. Another solenoid valve 42 controls the supply of oil pressure to a hydraulic servo for the direct coupled clutch 7. A computer 43 operated according to a predetermined program determines the operation of the solenoid valves 40, 41, 42 on the basis of signals of vehicle speed, opening of carbureter throttle valve and range position of shift lever to send the outputs respectively to the solenoid valves 40, 41, 42 through a amplifying section 44. A potentiometer 45 produces voltage proportional to the pedalling amount of an accelerator pedal 46 in a cab to send it to the computer 43.

Figure 2:
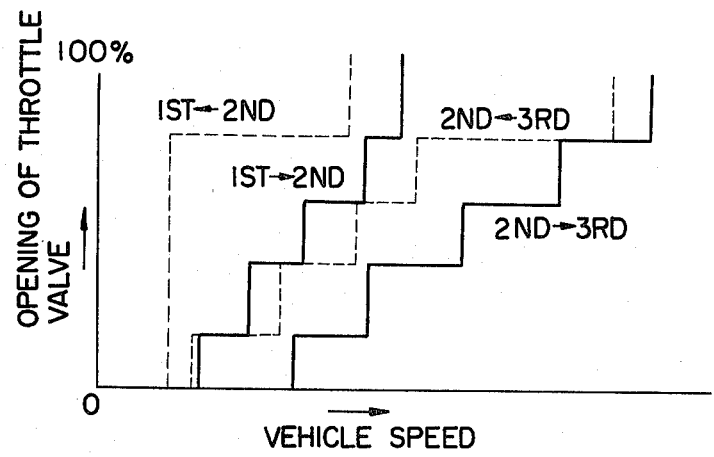
FIG. 2 is a speed change diagram of the automatic transmission shown in FIG. 1.
Figure 3:
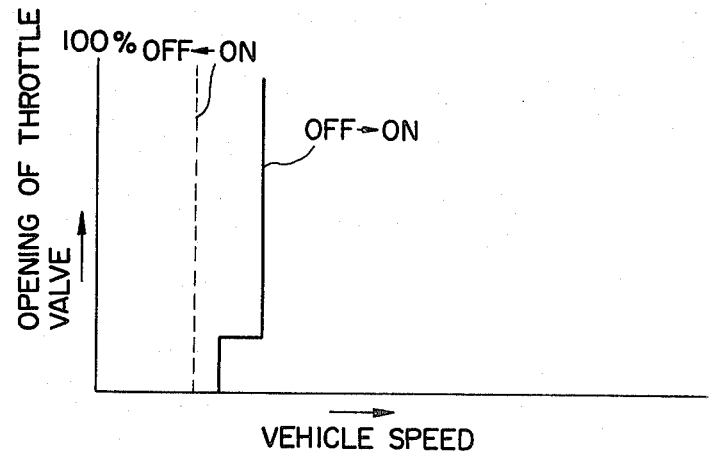
FIG. 3 is an operation diagram of a direct coupled clutch shown in FIG. 1.

FIG. 2 is a speed change diagram, in which the solid line shows the diagram in up-shift and the broken line shows the diagram in down-shift. FIG. 3 is an operation diagram of the direct coupled clutch 7 in which the direct coupled clutch 7 in the high vehicle speed side is maintained in the engaged condition, the solid line showing the operation diagram from OFF(disengagement) to ON(engagement) and the broken line showing the operation diagram from ON(engagement) to OFF(disengagement).

Figure 4:
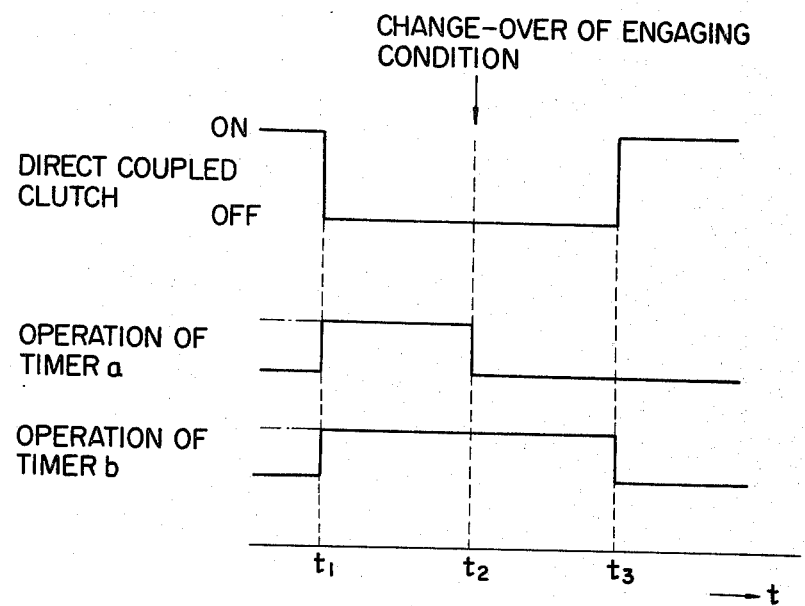
FIG. 4 is a diagram for explaining the engaging conditions of friction engaging elements which are changed over while the direct coupled clutch is maintained in the disengaged condition.

FIG. 4 is a diagram for explaining conceptually the operation of the automatic transmission in which the engagement and disengagement of the friction engaging elements are changed over while the direct coupled clutch 7 is temporarily maintained in the disengaged condition to prevent effectively the car body from variation of acceleration and vibration in the speed change. When the vehicle speed exceeds the predetermined value, the direct coupled clutch is maintained in the engaged condition and when in this period a speed change signal is produced in time $t_1$, for example, the direct coupled clutch 7 is turned from ON to OFF immediately while timers a, b start their operation. The operating time of the timer a is set shorter than that of the timer b. The solenoid valve 40 or 41 is operated at time $t_2$ when the operation of the timer a is completed so that the engaging condition of the friction engaging elements is changed over, and then the solenoid valve 42 is operated in time $t_3$ when the operation of the timer b is completed so that the direct coupled clutch 7 is again in the engaged condition from time $t_3$ on. Since the friction engaging elements are changed over with the direct coupled clutch 7 being maintained in the disengaged condition, unbalance between the output torque of the engine and the torque of the drive gear in the speed change is absorbed by the fluid type torque converter 1 to provide a better ride in the speed change.

Figure 5:
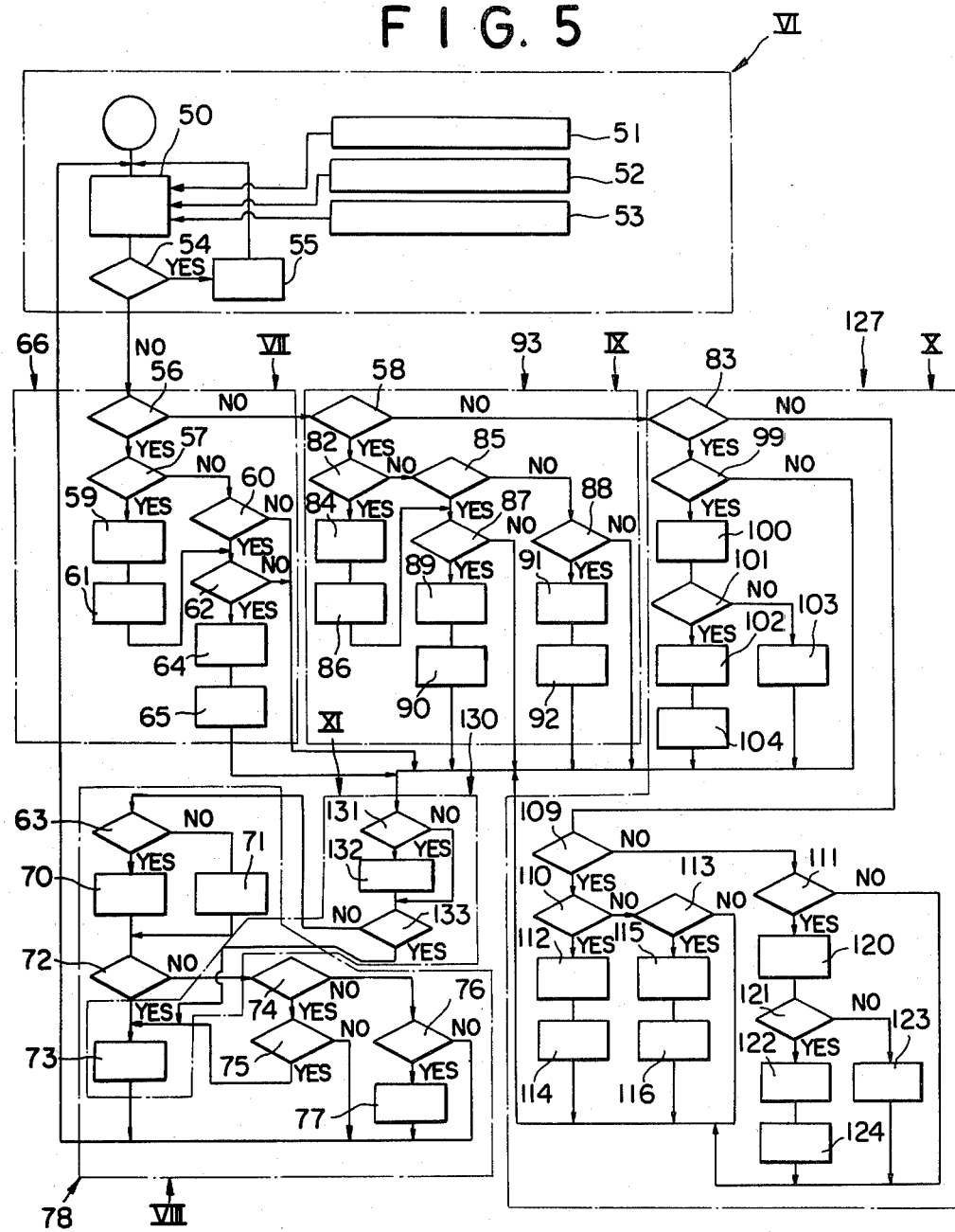
FIG. 5 is the whole flow chart of an embodiment of this invention.
Figure 6:
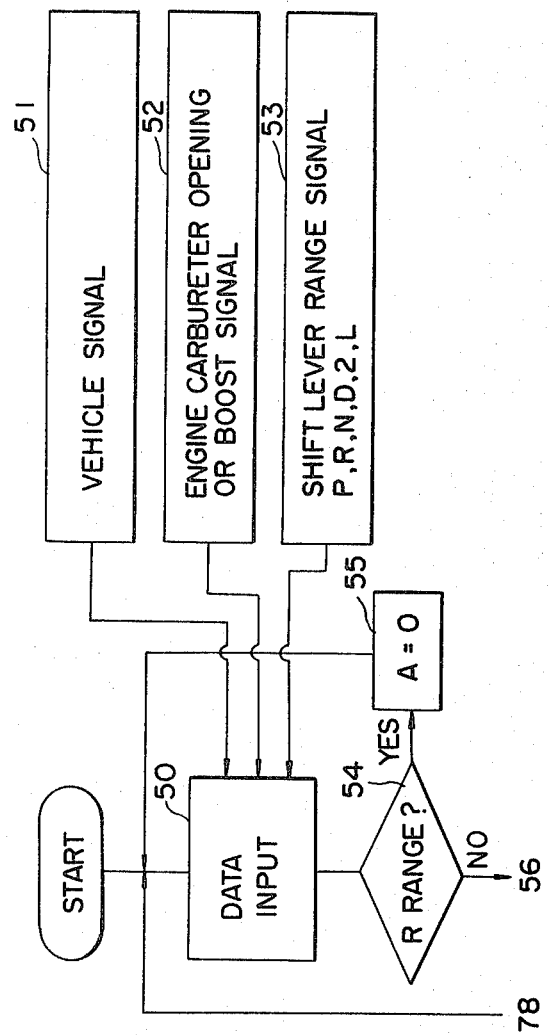
FIG. 6 is a detailed view of VI in FIG. 5.
Figure 7:
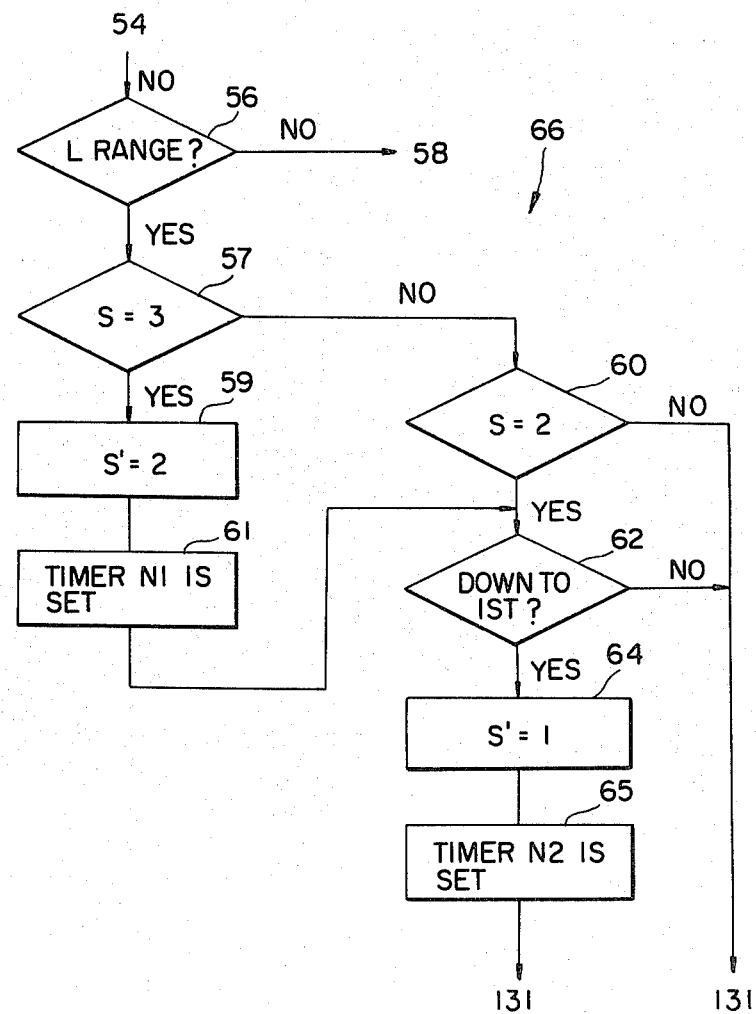
FIG. 7 is a detailed view of VII in FIG. 5.
Figure 8:
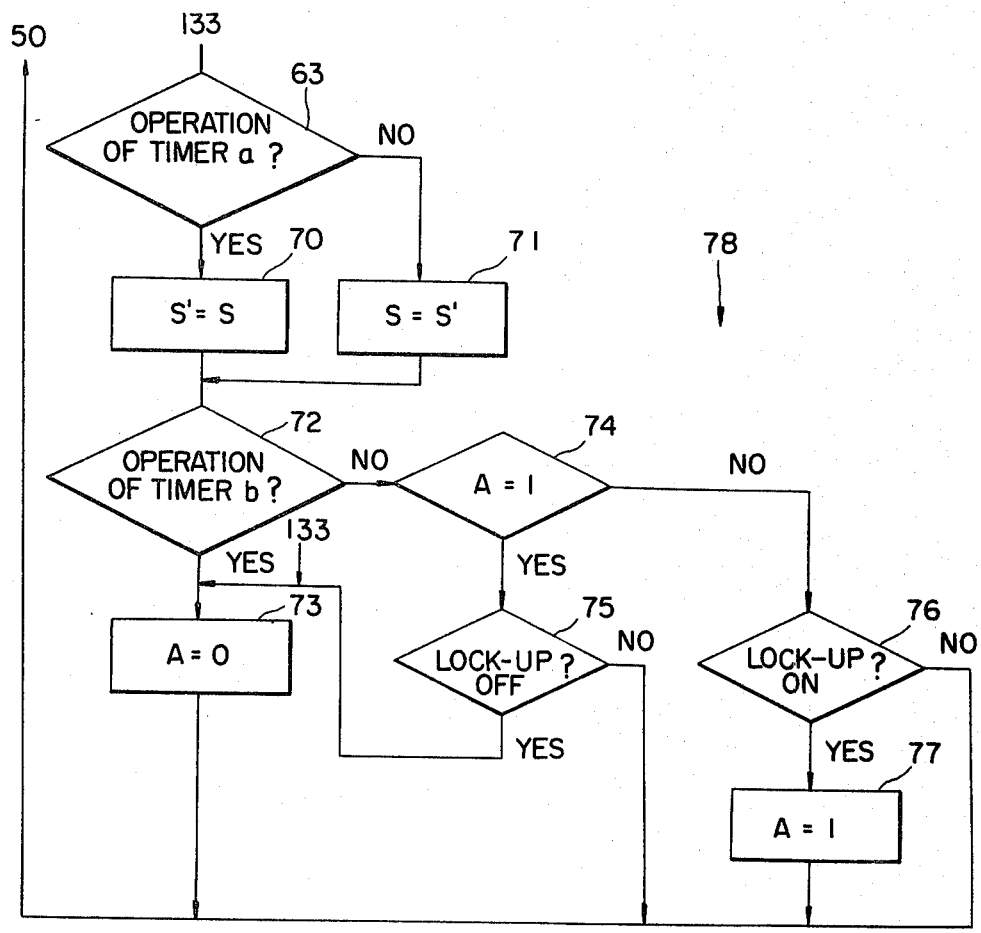
FIG. 8 is a detailed view of VIII in FIG. 5.
Figure 9:
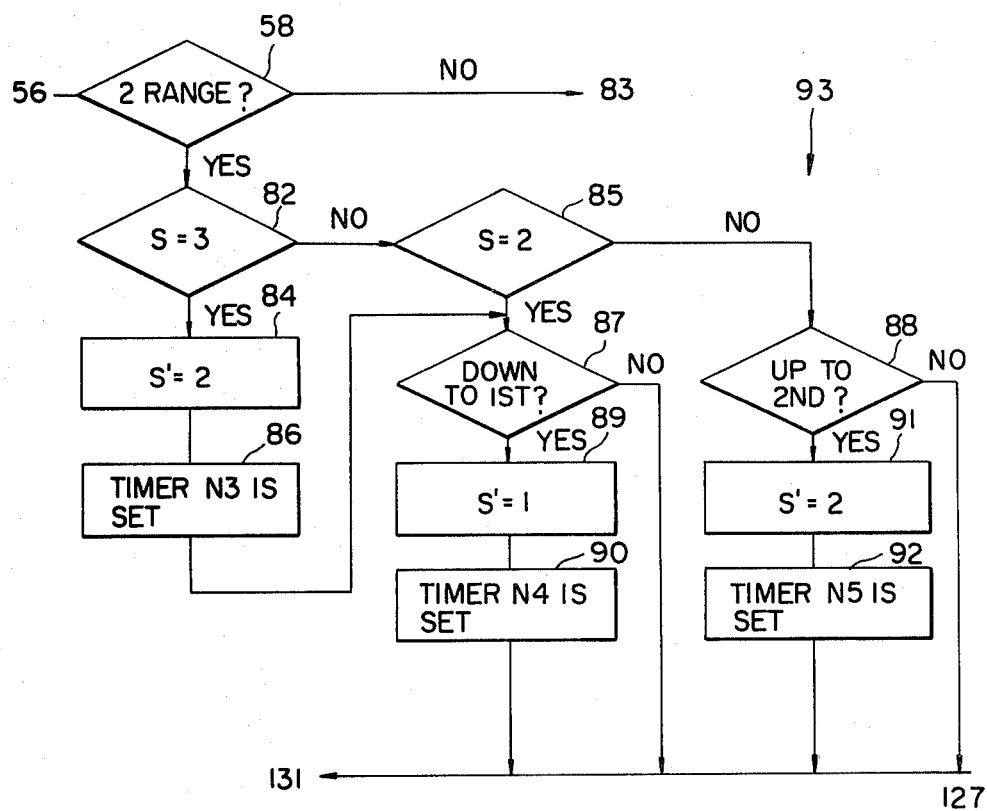
FIG. 9 is a detailed view of IX in FIG. 5.

FIG. 5 is a flow chart of an embodiment of this invention, and FIGS. 6 through 11 are detailed flow charts of portions of FIG. 5. While the main portion is a routine 130, the routine 130 is shown incorporated in a program for maintaining the direct coupled clutch in the disengaged condition in the speed change.

In step 50 (FIGS. 5 and 6) are read vehicle speed signals, signals of carbureter throttle opening or boost (negative pressure in intake pipe) and range signals of shift lever (P(Parking), R(Reverse), N(Neutral), D(Drive), 2(Second) and L(Low)) from the input points 51, 52, 53. In step 54 is judged whether or not the shift lever is in R range and the program proceeds to step 55 if it is judged yes and to step 56 if no. In step 55, A=0 (hereinafter the condition of the direct coupled clutch 7 is defined as A and the engaged and disengaged conditions of the direct coupled clutch 7 are respectively as A=1 and A=0) is set and the program returns to step 50.

In step 56 (FIGS. 5 and 7) is judged whether or not the shift lever is in L range and the program proceeds to step 57 if it is judged yes and to step 57 if no. In step 58 is judged whether or not S=3 (hereinafter, the conditions of the transmission gear 15 at a given time are defined as S and the condition of the transmission gear 15 being in the 1st speed, 2nd speed and 3rd speed is respectively defined as S=1, S=2 and S=3) and the program proceeds to step 59 if it is judged yes and to step 60 if no. In step 59, S'=2 (hereinafter the condition which the transmission gear 15 is commanded to next assume is defined as S' and commanded conditions of the 1st speed, 2nd speed and 3rd speed are respectively defined as S'=1, S'=2 and S'=3) is set. In step 61, timer N1 is set to start its operation and the program proceeds to step 62. Hereinafter timers N1, N2, ... N11 are defined to each have two kinds of counters of timers a, b. Also, the operating time of the timer b is set longer than that of the timer a. In step 60 is judged whether or not S=2 and the program proceeds to step 62 if it is judged yes and to step 131 if no. In step 62 is judged whether or not the transmission gear 15 should be shifted down to the 1st speed and the program proceeds to step 64 if it is judged yes and to routine 130 if no. In step 64, S'=1 is set and in step 65 timer N2 is set to start its operation. When the range shift to L range is thus carried out, processes shown on the following table are carried out corresponding to the cases of S=3,2,1 by a series of routines 66 comprising steps 56,57,60,61,62,64 and 65.

| L range Case | S = 3 Down to 2nd speed | S = 3 Down to 1st speed | S = 2 Maintenance of present condition | S = 2 Down to 1st speed | S = 1 |
|---|---|---|---|---|---|
| Sequence of step | 56 | 56 | 56 | 56 | 56 |
|  | 57 | 57 | 57 | 57 | 57 |
|  | 59 | 59 | 60 | 60 | 60 |
|  | 61 | 61 |  | 62 | 62 |
|  | 62 | 62 |  | 64 |  |
|  |  | 64 |  |  |  |
|  |  | 65 |  |  |  |
| Timer to be set | N1 | N2 | None | N2 | None |
| S' = | 2 | 1 | Unvaried | 1 | Unvaried |

In step 131 (FIGS. 5 and 11) of the routine 130 is judged whether or not the return speed of the accelerator pedal 46 exceeds a predetermined value (this condition is represented by D in FIG. 11) and the program proceeds to step 132 if it is judged yes and to step 133 if no. In step 132, a timer c is set to start its operation. In step 133 is judged whether or not the timer c is being operated and the program proceeds to step 73 if it is judged yes and to step 63 of routine 78 (FIG. 8) if no. In step 73, A=0 is set. Thus, in the routine 130, when the accelerator pedal 46 is returned with speed higher than a predetermined value, the timer c set to a predetermined time is operated to maintain the direct coupled clutch 7 in the disengaged condition during the operation of the timer c. Thus, the fluid type torque converter 1 absorbs the variation of transmission torque of the drive system in the abrupt return of the accelerator pedal so that the car body is prevented from the sway causing a rough ride.

In step 63 (FIG. 8) is judged whether or not the timer a is still being operated and the program proceeds to step 70 if it is judged yes and to step 71 if no. In step 70, S'=S is set and the program proceeds to step 72. In step 71, S=S' is set and the program proceeds to step 72. In step 72 is judged whether or not the timer b is still being operated and the program proceeds if it is judged yes and to step 74 if no. In step 73, A=0 is set and then the program returns to step 50. In step 74 is judged whether or not A=1 and the program proceeds to step 75 if it is judged yes and to step 76 if no. In step 75 is judged whether the engine at that time is in the range to disengage the direct coupled clutch 7 on the basis of the operation diagram shown in FIG. 3 (lock-up OFF) or not (lock-up ON) and the program proceeds to step 73 if it is judged yes and returns to step 50 if no. In step 76 is judged whether or not the clutch 7 is in the range of lock-up ON and the program proceeds to step 77 and set A=1 if it is judged yes, and then returns to step 50 and returns to step 50 immediately if it is judged no.

According to a routine 78 (FIG. 8) containing a series of steps 63,70,71,72,73,74,75,76 and 77, processes shown on the following table are carried out corresponding to the operation of timers a,b.

|  | During operation of timer a | During operation of timer b | After completion of operation of timer a | |
|---|---|---|---|---|
|  |  |  | After completion of operation of timer b | |
| Case |  |  | lock-up ON | lock-up OFF |
| Sequence of step | 63 | 63 | 63 | 63 |
|  | 70 | 71 | 71 | 71 |
|  | 72 | 72 | 72 | 72 |
|  | 73 | 73 | 74 | 74 |
|  |  |  | 75,76 | 75 76 |
|  |  |  | 77 | 73 |
| A = | 0 | 0 | 1 | 0 |
| S | Unvaried | S' | S' | S' |

In step 58 (FIG. 9) is judged whether or not the shift lever is in 2 range and the program proceeds to step 82 if it is judged yes and to step 83 if no. In step 82 is judged whether or not S=3 and the program proceeds to step 84 if it is judged yes and to step 85 if no. In step 84, S'=2 is set. In step 86, the timer N3 is set to start its operation and the program proceeds to step 87. In step 85 is judged whether or not S=2 and the program proceeds to step 87 if it is judged yes and to step 88 if no. In step 87 is judged whether or not the transmission gear 15 should be shifted down to the 1st speed and the program proceeds to step 89 if it is judged yes and to routine 130 if no. In step 89, S'=1 is set and in step 90, the timer N4 is set to start its operation. In step 88 is judged whether or not the transmission gear 15 should be shifted up to the 2nd speed and the program proceeds to step 91 if it is judged yes and to routine 130 if no. In step 91, S'=2 is set and in step 92, the timer N5 is set to start its operation. According to a series of routines 93 containing steps 58,82,84,85,86,87,88,89,90,91 and 92 are carried out processes shown on the following table:

| 2 range | | | | | | |
|---|---|---|---|---|---|---|
|  | S = 3 | | S = 2 | | S = 1 | |
| Case | Down to 1st speed | Down to 2nd speed | Down to 1st speed | Maintenance of present condition | Maintenance of present condition | Up to 2nd speed |
| Sequence of step | 58 | 58 | 58 | 58 | 58 | 58 |
|  | 82 | 82 | 82 | 82 | 82 | 82 |
|  | 84 | 84 | 85 | 85 | 85 | 85 |
|  | 86 | 86 | 87 | 87 | 88 | 88 |
|  | 87 | 87 | 89 | | | 91 |
|  | 89 | | 90 | | | 92 |
|  | 90 | | | | | |
| Timer to be set | N4 | N3 | N4 | None | None | N5 |
| S' | 1 | 2 | 1 | Unvaried | Unvaried | 2 |

Figure 10:
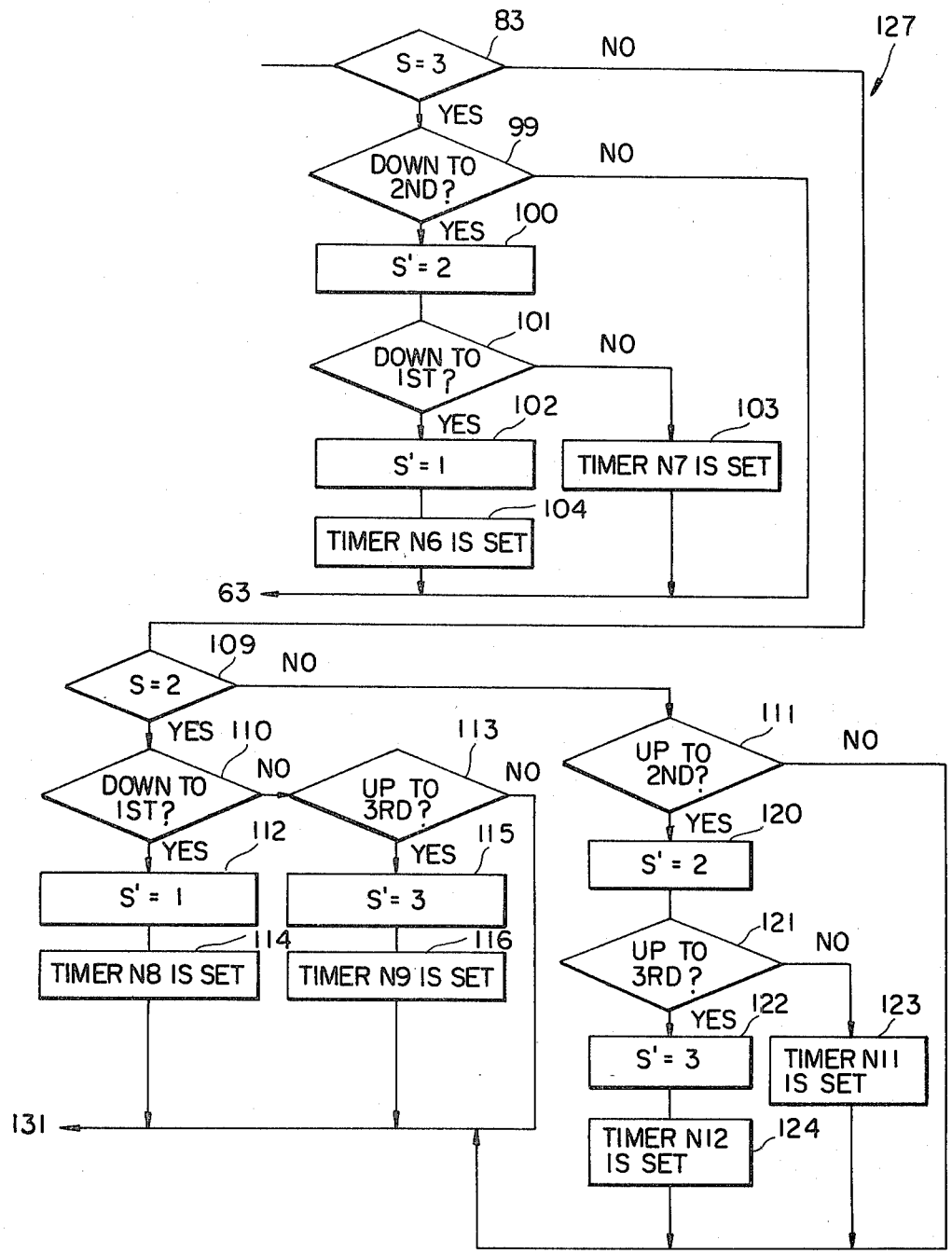
FIG. 10 is a detailed view of X in FIG. 5.
Figure 11:
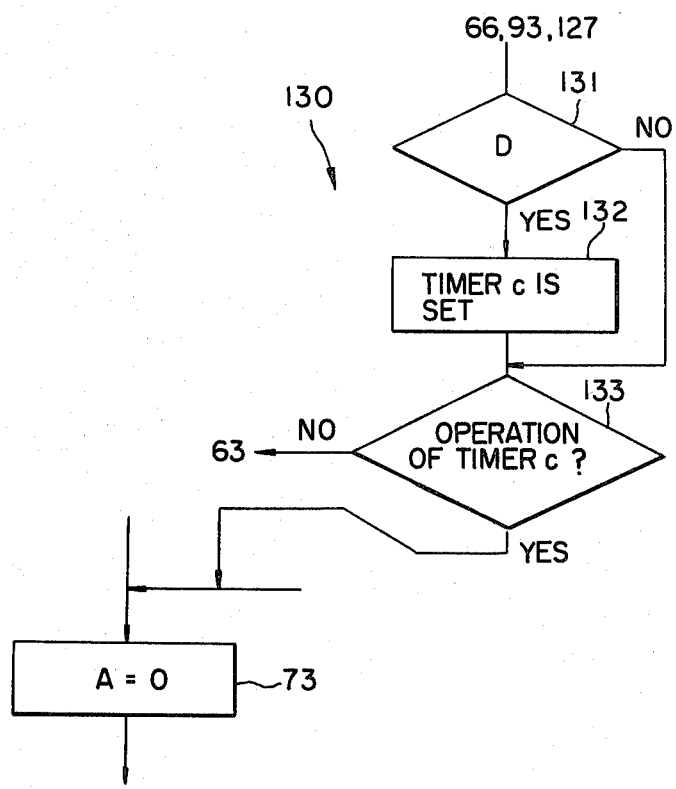
FIG. 11 is a detailed view of XI in FIG. 5.

In step 83 FIG. 10 is judged whether or not S=3 and the program proceeds to step 99 if it is judged yes and to step 109 if no. In step 99 is judged whether or not the transmission gear 15 should be shifted down to the 2nd speed and the program proceeds to step 100 if it is judged yes and to routine 130 if no. In step 100, S'=2 is set. In step 101 is judged whether or not the transmission gear 15 should be shifted down to the 1st speed and the program proceeds to step 102 if it is judged yes and to step 103 if no. In step 102, S'=1 is set and in step 104, the timer N6 is set to start its operation. In step 103, the timer N7 is set to start its operation.

In step 109 is judged whether or not S=2 and the program proceeds to step 110 if it is judged yes and to step 111 if no. In step 110 is judged whether or not the transmission gear 15 should be shifted down to the 1st speed and the program proceeds to step 112 if it is judged yes and to step 113 if no. In step 112, S'=1 is set and in step 114, the timer N8 is set to start its operation. In step 113 is judged whether or not the transmission gear 15 should be shifted up to the 3rd speed and the program proceeds to step 115 if it is judged yes and to routine 130 if no. In step 115, S'=3 is set. In step 116, the timer N9 is set to start its operation. In step 111, is judged whether or not the transmission gear 15 should be shifted up to the 2nd speed and the program proceeds to step 120 if it is judged yes and to routine 130 if no. In step 120, S'=2 is set. In step 121 is judged whether or not the transmission gear 15 should be shifted up to the 3rd speed and the program proceeds to step 122 if it is judged yes and to step 123 if no. If step 122, S'=3 is set and in step 124, the timer N10 is set to start its operation. In step 123, the timer N11 is set to start its operation. According to a series of routines 127 containing steps 83, 99,100,101,102,103,104,109,110,111,112,113,114,115,116,120, 121, 122,123 and 124 are carried out processes shown on the following table:

| | S = 3 | | | S = 2 | | | S = 1 | | |
|---|---|---|---|---|---|---|---|---|---|
| Case | Down to 1st speed | Down to 2nd speed | Maintenance of present condition | Down to 1st speed | Maintenance of present condition | Up to 3rd speed | Maintenance of present condition | Up to 2nd speed | Up to 3rd speed |
| Sequence of step | 83 99 100 101 102 104 | 83 99 100 101 103 | 83 99 | 83 109 110 112 114 | 83 109 110 113 | 83 109 110 113 115 116 | 83 109 111 | 83 109 111 120 121 123 | 83 109 111 120 121 122 |
| Timer to be set | N6 | N7 | None | N8 | None | N9 | None | N11 | N10 |
| S' = | 1 | 2 | Unvaried | 1 | Unvaried | 3 | Unvaried | 2 | 3 |

D range

Timer set in the speed change within D range are shown on the following table;

| | After speed change | | |
|---|---|---|---|
| Before speed change | 1st speed | 2nd speed | 3rd speed |
| 1st speed | | N11 | N10 |
| 2nd speed | N8 | | N9 |
| 3rd speed | N6 | N7 | |

The set time of the timers a,b in the timers N6–N11 are selected properly and independently of each other in relation to the types of the automatic transmission.

Thus, according to this invention, when the accelerator pedal is returned with the speed higher than a predetermined value, the direct coupled clutch provided in parallel to the fluid type torque converter is maintained in the disengaged condition so that the variation of the transmission torque in drive system is absorbed by the fluid type torque converter to maintain a good ride.

What is claimed is:

1. Speed change control apparatus for an automatic transmission of a vehicle, comprising:
   (a) a fluid-type torque converter;
   (b) a transmission gear directly connected to said torque converter and comprising a plurality of friction-engaging elements for performing speed changes of the vehicle;
   (c) a direct coupled clutch operable between engaged and disengaged conditions, and connected in parallel with said torque converter;
   (d) a hydraulic servo for operating said direct coupled clutch and said friction-engaging elements;
   (e) an electromagnetic valve for controlling oil pressure to said hydraulic servo in response to vehicle speed and engine load; and
   (f) disengagement means coupled to an accelerator pedal of the vehicle for maintaining said direct coupled clutch in the disengaged condition for a predetermined time after return speed of the accelerator pedal exceeds a predetermined value.

2. Apparatus as defined in claim 1, wherein said disengagement means comprises a first timer activated when the return speed of the accelerator pedal exceeds said predetermined value, and said direct coupled clutch is maintained in the disengaged condition during the operation of said first timer.

3. Apparatus as recited in claim 2, further comprising a potentiometer connected to said disengagement means for producing a signal in response to the pedalling amount of the acceleration pedal, the return speed of the accelerator pedal being detected by said disengagement means from said potentiometer signal.

4. Apparatus as recited in claim 3, wherein a change in the engaging condition of said friction-engaging elements in said the transmission gear is carried out while maintaining said direct coupled clutch in the disengaged condition.

5. Apparatus as recited in claim 4, wherein said disengagement means comprises second and third timers operated during a speed change, the operating time of said third timer being longer than that of said second timer, said direct coupled clutch being maintained in the disengaged condition during the operation of said third timer and a change in the engaging condition of said friction-engaging elements in said transmission gear being carried out between the completion of the operation of said second timer and the operation of said third timer.

6. Apparatus as recited in claim 5, wherein the alteration of the engaging condition of said friction-engaging elements in said transmission gear is stopped during the operation of said first timer.

7. A method for controlling speed changes in an automatic transmission for a vehicle having a torque converter and a direct coupled clutch connected in parallel, said method comprising the steps of:
   (a) controlling the supply of oil pressure to a hydraulic servo controlling the direct coupled clutch and the friction-engaging elements of the transmission by an electromagnetic valve in response to vehicle speed and engine load; and
   (b) maintaining the direct coupled clutch in a disengaged condition for a predetermined time after the return speed of the vehicle's accelerator pedal exceeds a predetermined value.

8. A method as recited in claim 7, wherein a first timer is activated when the vehicle's accelerator pedal exceeds said predetermined value, and the direct coupled clutch is maintained in the disengaged condition during operation of said first timer.

9. A method as recited in claim 8, wherein the return speed of the vehicle's accelerator pedal is detected by detecting signals produced by a potentiometer in response to the pedalling amount of the accelerate pedal.

10. A method as recited in claim 9, wherein a change in the engaging condition of the friction-engaging elements of the transmission gear is carried out while maintaining the direct coupled clutch in the disengaged condition.

11. A method as recited in claim 10, wherein second and third timers are operated during a speed change, the operating time of the third timer being longer than that of the second timer, the direct coupled clutch being maintained in the disengaged condition during the operation of the third timer and a change in the engaging condition of the friction-engaging elements in the transmission gear being carried out between the completion of the operation of the second timer and the completion of the operation of the third timer.

12. A method as recited in claim 11, wherein a change in the engaging condition of the friction-engaging elements in the transmission gear is stopped during operation of the first timer.

* * * * *